(12) United States Patent
Degerstrom et al.

(10) Patent No.: US 7,761,276 B1
(45) Date of Patent: Jul. 20, 2010

(54) APPARATUS AND METHOD FOR PORT REDUCTION IN SIMULATION FILES

(75) Inventors: Michael J. Degerstrom, Rochester, MN (US); Matthew L. Bibee, Bloomington, MN (US)

(73) Assignee: Xilinx, Inc., San Jose, CA (US)

( * ) Notice: Subject to any disclaimer, the term of this patent is extended or adjusted under 35 U.S.C. 154(b) by 845 days.

(21) Appl. No.: 11/527,831

(22) Filed: Sep. 27, 2006

(51) Int. Cl.
*G06F 17/50* (2006.01)

(52) U.S. Cl. ............... 703/14; 703/18; 716/1; 716/2; 716/4; 716/5

(58) Field of Classification Search ............ 703/14, 703/18; 716/1, 2, 4, 5
See application file for complete search history.

(56) References Cited

U.S. PATENT DOCUMENTS

| | | | |
|---|---|---|---|
| 5,623,420 A * | 4/1997 | Yee et al. ........................ 716/1 |
| 5,815,402 A * | 9/1998 | Taylor et al. ................... 716/12 |
| 5,946,218 A * | 8/1999 | Taylor et al. ................... 716/12 |
| 6,237,007 B1 * | 5/2001 | Brown ........................ 707/104.1 |
| 6,606,734 B2 * | 8/2003 | Greaves ........................... 716/4 |
| 6,725,438 B2 * | 4/2004 | van Ginneken .............. 716/10 |
| 7,272,546 B1 * | 9/2007 | Brown et al. ................... 703/13 |
| 2003/0065498 A1 * | 4/2003 | Bois et al. ....................... 703/19 |
| 2006/0101135 A1 * | 5/2006 | Li .................................. 709/223 |
| 2007/0044051 A1 * | 2/2007 | McGaughy et al. ............ 716/5 |

OTHER PUBLICATIONS

Brian Young; *Digital Signal Integrity : Modeling and Simulation with Interconnects and Packages*; published by Prentice Hall; 2000; pp. 163-166 and 213-216.

* cited by examiner

*Primary Examiner*—Dwin M Craig
(74) *Attorney, Agent, or Firm*—Michael T. Wallace; John J. King; Thomas George (57) ABSTRACT

Various port reduction methods are employed to reduce the number of port definitions in a simulation file. A ground port reduction method is first employed to reduce certain power supply reference connections to an absolute ground reference for the circuit model. Next, all commonly defined port definitions are combined into a single port definition. Finally, a current analysis is used to further reduce the number of port definitions in the simulation file by removing the current return ports from the simulation file.

20 Claims, 4 Drawing Sheets

APPARATUS AND METHOD FOR PORT REDUCTION IN SIMULATION FILES

FIELD OF THE INVENTION

The present invention generally relates to circuit simulations, and more particularly to the simplification of S-parameter simulation models used in the circuit simulations.

BACKGROUND

Communication developments in the last decade have demonstrated what seems to be a migration from parallel data input/output (I/O) interface implementations to a preference for serial data I/O interfaces. Some of the motivations for preferring serial I/O over parallel I/O include reduced system costs through reduction in pin count, simplified system designs, and scalability to meet the ever increasing bandwidth requirements of today's communication needs. Serial I/O solutions will most probably be deployed in nearly every electronic product imaginable, including IC-to-IC interfacing, backplane connectivity, and box-to-box communications.

As the migration to serial communication devices proliferates, so does the demand for higher bandwidth. As the data bandwidth increases, however, data propagation losses through integrated circuit (IC) packaging becomes increasingly predominant. Thus, scattering parameter (S-parameter) techniques are generally required to accurately simulate high-data rate, e.g., 10 Gbps, serial data paths through today's high performance IC packaging, such as for example, ball grid array (BGA) packaging. S-Parameter techniques may also be used to characterize the effects of components within these high performance packages, such as connectors, blocking capacitors, etc.

Integrating high-data rate serial data paths with internal IC logic, however, typically requires the use of a serializer/deserializer (SERDES) device to convert the incoming serial data into a parallel data path and to convert the outgoing parallel data into a serial data path. Thus, in order to properly simulate SERDES operations, S-parameter simulation models are typically combined with complex SERDES simulation models.

The combination of SERDES and S-parameter simulation models typically results in a simulation model that is burdened with a large number of input/output (I/O) ports. Increasing the number of I/O ports of a particular simulation file, however, increases the amount of time required to properly simulate the device. Thus, simulation operations requiring a large number of computations, such as the generation of an eye diagram, may require an excessive amount of time to complete.

One method to decrease the amount of simulation time required, is to increase the amount of computational power that is available within the simulation platform being utilized. Such a method, however, may be cost prohibitive or simply unavailable. Efforts continue, therefore, to reduce the complexity of the simulation files, while maintaining an accurate representation of the device model so as to create accurate simulation results in less time.

SUMMARY

To overcome limitations in the prior art, and to overcome other limitations that will become apparent upon reading and understanding the present specification, various embodiments of the present invention disclose an apparatus and method for port reduction in an S-parameter simulation file.

In accordance with one embodiment of the invention, a method of reducing a number of ports within a circuit simulation file comprises consolidating ground ports within the circuit simulation file, consolidating a first set of common ports within the circuit simulation file, identifying a return port within the circuit simulation file, referencing a second set of common ports to the return port, and removing the return port from the circuit simulation file.

In accordance with another embodiment of the invention, a computer-readable medium having instructions stored thereon which are executable by a circuit simulation device for reducing a number of ports within a circuit simulation file. The instructions perform steps comprising consolidating ground ports within the circuit simulation file, consolidating a first set of common ports within the circuit simulation file, identifying a return port within the circuit simulation file, referencing a second set of common ports to the return port, and removing the return port from the circuit simulation file.

In accordance with another embodiment of the invention, a circuit simulation system comprises a processor that is adapted to generate a reduced port S-parameter file from a multiple port S-parameter file. The processor is adapted to perform computations including generating the multiple port S-parameter file, consolidating ground ports within the multiple port S-parameter file to generate a first reduction file, where the first reduction file has fewer port definitions as compared to the multiple port S-parameter file. The processor is further adapted to perform computations including consolidating a first set of common ports within the first reduction file to generate a second reduction file, where the second reduction file has fewer port definitions as compared to the first reduction file. The processor is further adapted to perform computations including referencing a second set of common ports in the second reduction file to a return port and removing the return port from the second reduction file to generate the reduced port S-parameter file, where the reduced port S-parameter file has fewer port definitions as compared to the second reduction file.

BRIEF DESCRIPTION OF THE DRAWINGS

Various aspects and advantages of the invention will become apparent upon review of the following detailed description and upon reference to the drawings in which.

DETAILED DESCRIPTION

Generally, various embodiments of the present invention provide an apparatus and method to accurately simulate high-data rate signal paths using advanced integrated circuit (IC) packaging models, such as ball grid array (BGA) IC packaging. Scattering parameter (S-parameter) files are initially generated, which define the simulation file to be used to model the IC package and associated serial input/output (I/O) circuitry.

A typical S-parameter file for a BGA packaged serial transmitter, for example, contains definitions of the differential transmission path ports, power supply wirebonds, and power supply solder ball connections. The S-parameter file is then ported into an S-parameter file optimizer, which seeks to reduce the number of port definitions contained within the S-parameter file.

A ground port reduction method is first employed to reduce certain power supply reference connections to an absolute ground reference for the circuit model. Next, all commonly defined port definitions, such as open circuit ports, power supply ports, and impedance matching ports, are combined into a single port definition. Finally, a current analysis is used to further reduce the number of port definitions in the S-parameter file by removing the current return ports from the S-parameter file.

Once the number of ports within the S-parameter file has been optimally reduced, the S-parameter file is ported into a sub-circuit generator, whereby a circuit definition file is generated. The circuit definition file may then be ported into a circuit simulator, whereby the functionality of the circuit may be characterized through simulation.

Figure 1:
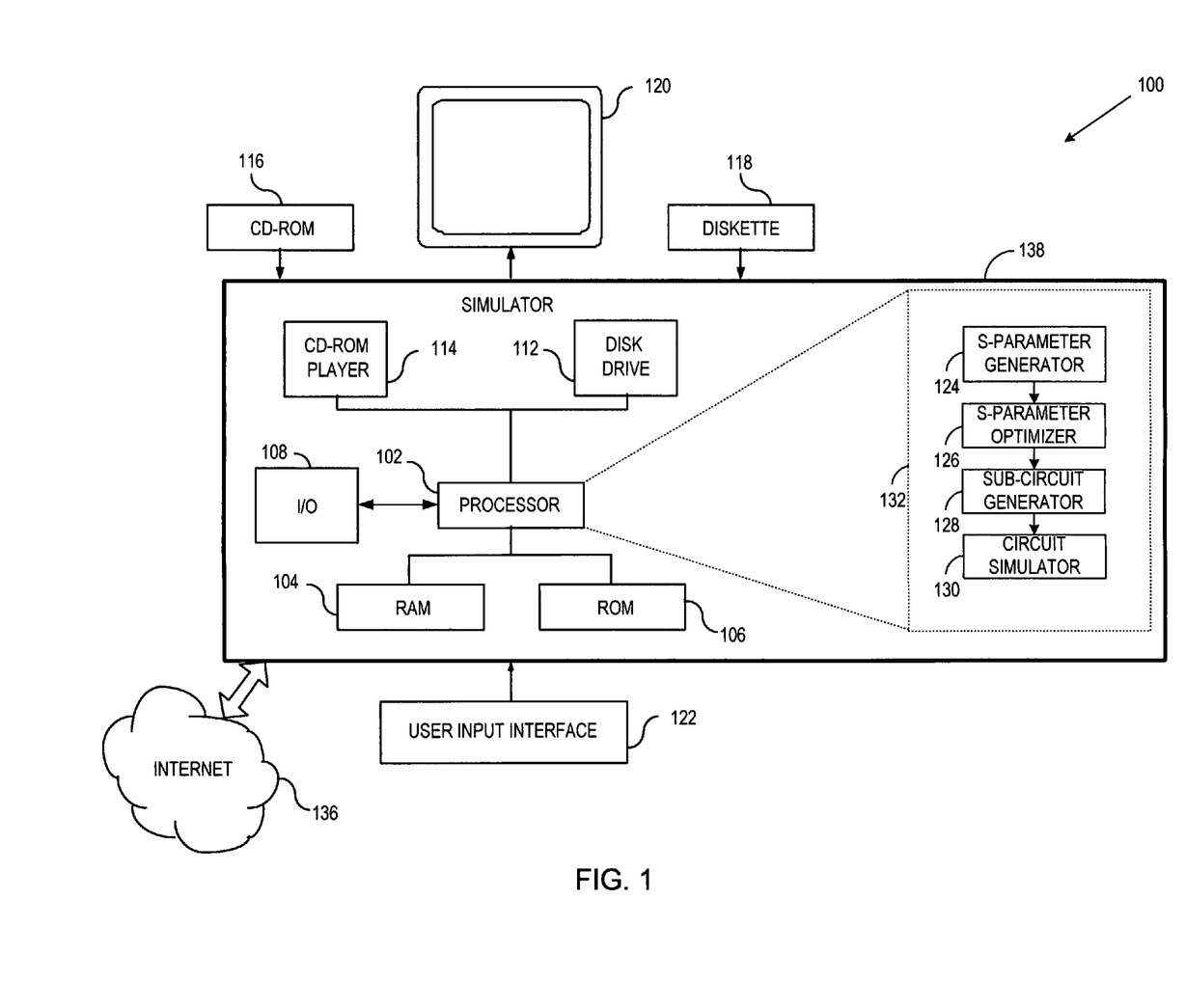
FIG. 1 illustrates an exemplary S-parameter simulation station.

Turning to FIG. 1, an exemplary simulation workstation is illustrated, which may be used to generate the S-parameter optimizations, circuit definition files, and circuit simulations that may be necessary to simulate a high performance package, such as for example, a BGA IC package. The exemplary simulation workstation includes simulator 138, which includes a central processor (CPU) 102 that is coupled to random access memory (RAM) 104 and read-only memory (ROM) 106. The ROM 106 may also include other types of storage media to store programs, such as programmable ROM (PROM), electronically erasable PROM (EEPROM), etc. The processor 102 may also communicate with other internal and external components through input/output (I/O) circuitry 108.

Simulator 138 may also include one or more data storage devices, including hard and floppy disk drives 112, CD-ROM drives 114, and other hardware capable of reading and/or storing information such as DVD, etc. Software for facilitating the S-parameter file optimizations, circuit definition files, and circuit simulations may be stored and distributed on a CD-ROM 116, diskette 118 or other forms of media capable of portably storing information. These storage media may be inserted into, and read by, devices such as the CD-ROM drive 114, the disk drive 112, etc.

The software for facilitating the S-parameter file optimizations, circuit definition files, and circuit simulations may also be transmitted to simulator 138 via data signals, such as being downloaded electronically via a network, such as Internet 136. Simulator 138 is coupled to a display 120, which may be any type of known display or presentation screen, such as LCD displays, plasma display, cathode ray tubes (CRT), etc. A user input interface 122 is provided, including one or more user interface mechanisms such as a mouse, keyboard, microphone, touch pad, touch screen, voice-recognition system, etc.

Processor 102 may be used to execute simulation tools 132 to aid in simulation operations. S-parameter generator 124, for example, generates the baseline S-parameter files that correspond to a particular simulation model. S-parameter optimizer 126 receives the S-parameter files from S-parameter generator 124 and performs one or more port reduction methods to reduce the number of port definitions contained within the S-parameter file. Sub-circuit generator 128 then receives the optimized S-parameter definition file and generates the circuit definition files that are required by circuit simulator 130 to characterize the sub-circuit's operation.

Figure 2A:
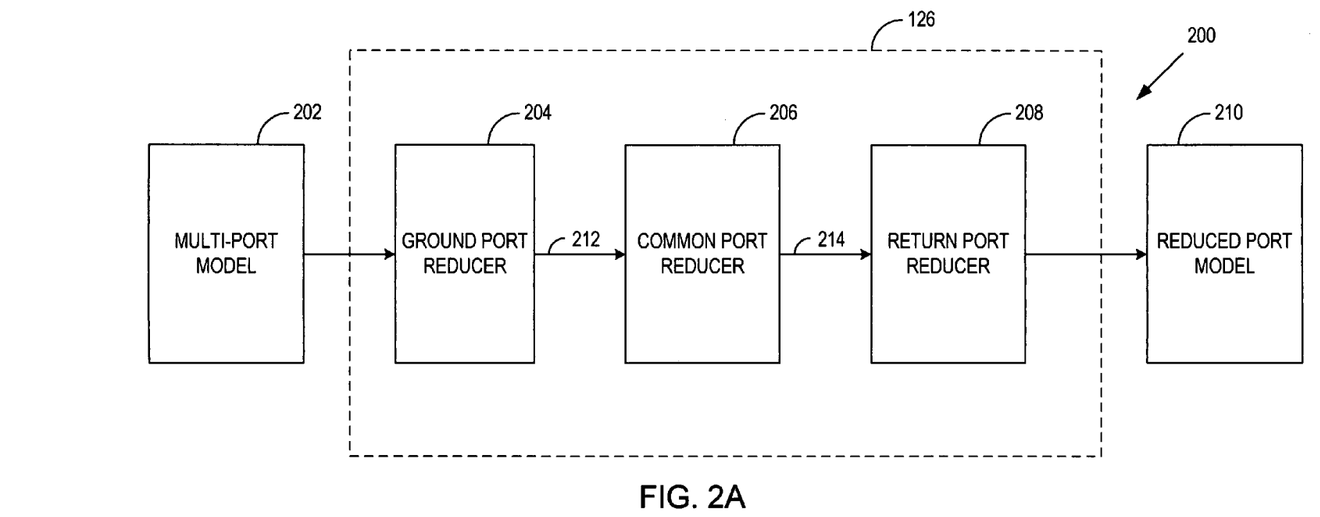
FIG. 2A illustrates an exemplary block diagram of the S-parameter optimizer of FIG. 1.

Turning to FIG. 2A, block diagram 200 illustrates a functional block diagram that further exemplifies the operation of S-parameter optimizer 126 of FIG. 1. S-parameter optimizer 126, for example, may receive multi-port model 202 from S-parameter generator 124, where multi-port model 202 may be exemplified by multi-port simulation model 252 of FIG. 2B. In one embodiment, multi-port simulation model 252 may represent signal, power and ground paths for a transmitter implemented within a BGA package, having various chip-side ports, as denoted by the C-subscripted ports on the left side of multi-port simulation model 252, and various solder ball ports, as denoted by the B-subscripted ports on the right side of multi-port simulation model 252.

Figure 2B:
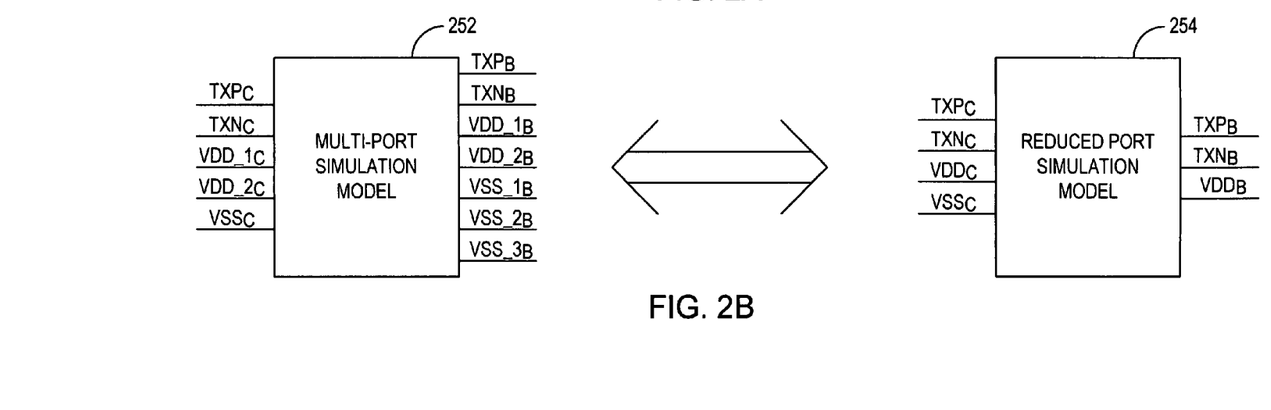
FIG. 2B illustrates exemplary results of an S-parameter port reduction process.

As discussed in more detail below, ground port reducer 204 operates to delete the $VSS\_1_B$, $VSS\_2_B$, and $VSS\_3_B$ solder ball ports on the right side of multi-port simulation model 252. Ground port reducer 204 then reduces the deleted solder ball ports to an absolute ground connection definition as reflected in ground port reduced, S-parameter file 212 that is provided as an input to common port reducer 206.

As further discussed in more detail below, common port reducer 206 receives ground port reduced, S-parameter file 212 and further reduces the port definitions contained therein. In particular, common port reducer 206 identifies common port definitions on both sides of multi-port simulation model 252, such as common ports, $VDD\_1_C$, $VDD\_2_C$, $VDD\_1_B$, and $VDD\_2_B$. Each port identified as being common is combined into a single port according to its subscript. In other words, ports $VDD\_1_C$ and $VDD\_2_C$ are combined into a single, chip-side port, $VDD_C$, and ports $VDD\_1_B$ and $VDD\_2_B$ are combined into a single, solder ball port, $VDD_B$. Common port reducer 206 then delivers the ground and common port reduced S-parameter file 214 to return port reducer 208.

Return port reducer 208 then performs a current analysis on the remaining ports of S-parameter file 214 to determine the final reduction in the number of ports remaining in the S-parameter file. In particular, the remaining chip-side ports may either be characterized as current providing ports or as a single current return port. Once identified, the single current return port on the chip side may be isolated and subsequently removed from the S-parameter file. The resulting S-parameter file is the fully optimized S-parameter file 210, which defines the exemplary reduced port simulation model 254 of FIG. 2B.

Figure 3:
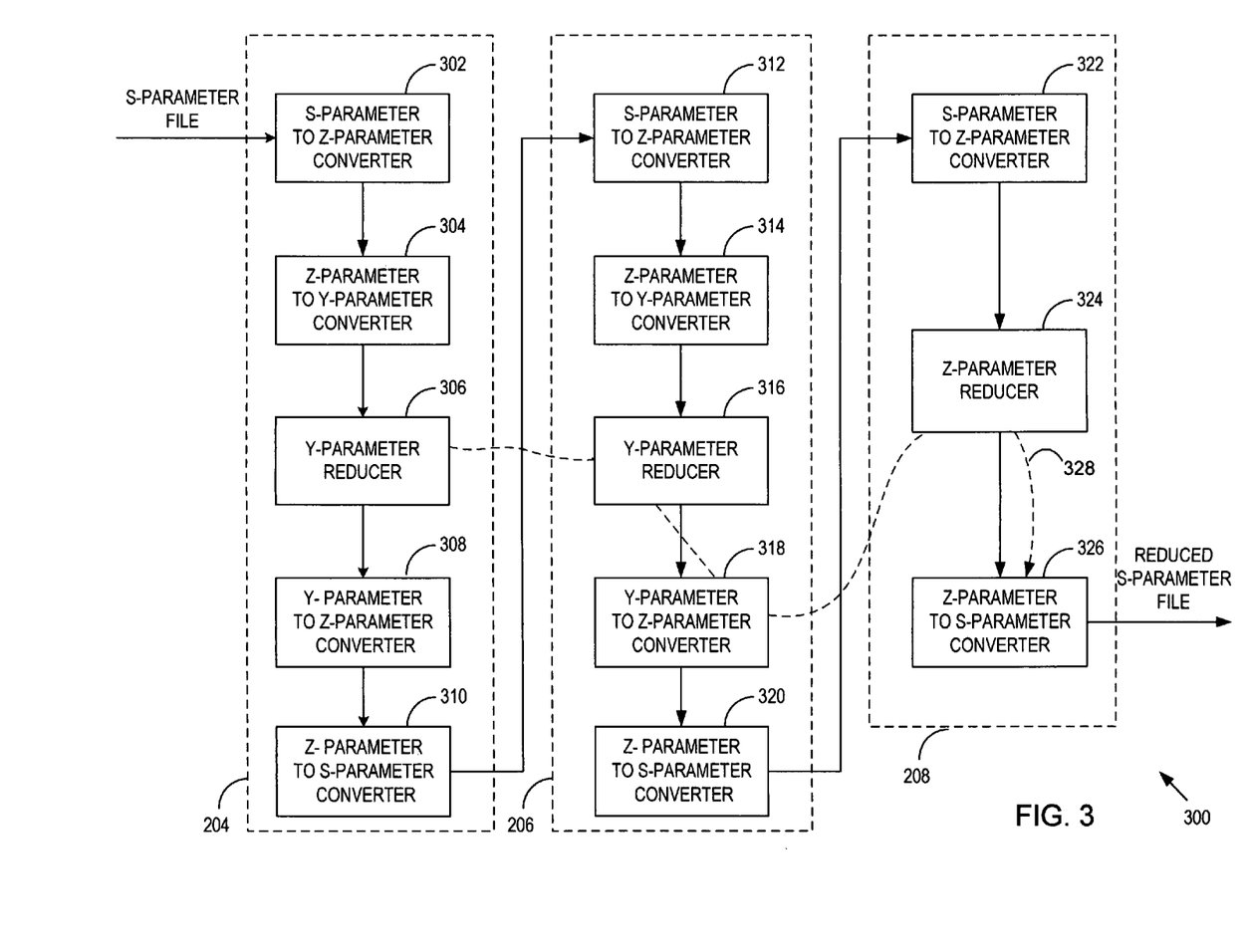
FIG. 3 illustrates a functional block diagram of the S-parameter optimizer of FIG. 2A.

Turning to FIG. 3, each of port reduction blocks 204-208 is explained in further detail. Ground port reduction block 204 seeks to identify those ports of multi-port model 252 of FIG. 2B which may be used as an absolute ground reference in the sub-circuit model. Restrictions as to which ports may be selected as absolute ground reference ports, however, do exist.

For example, a power supply port is, for alternating current (AC) purposes, a ground port. However, since these ports deliver direct current (DC) power supply and/or bias signals to the on-chip circuitry, they may not be eliminated. In addition, ground ports that tie directly to the on-chip circuitry may not be eliminated, since non-ideal ground currents may be flowing in these ground ports, thus disqualifying them as ideal grounds. In other words, by allowing the elimination of these ground ports from the S-parameter file, a zero-voltage condition is forced upon these ground ports, which may introduce simulation anomalies into the optimized S-parameter file.

The remaining ports available for the ground port reduction process of block 204 are the $VSS\_1_B$, $VSS\_2_B$, and $VSS\_3_B$ solder ball ports as illustrated by multi-port simulation model 252 of FIG. 2A. In order to reduce these ports to ground, the S-parameter file is first converted to Z-parameters by S-parameter to Z-parameter converter block 302. In particular, S-parameter to Z-parameter converter block 302 performs the calculation of equation (1):

$$\overline{Z} = Z_0 (\overline{U} - \overline{S})^{-1} (\overline{U} + \overline{S}), \tag{1}$$

where $\overline{U}$ is the identity matrix, $\overline{S}$ is the S-parameter matrix, and $Z_0$ is the port impedance, which in one embodiment may be set to 50 ohms.

Next, the Z-parameters are converted to Y-parameters by Z-parameter to Y-parameter converter 304 through the use of equation (2):

$$\overline{Y} = \frac{1}{\overline{Z}}. \tag{2}$$

Next, the Y-parameter matrix may be reduced, i.e., consolidated, through operation of Y-parameter reducer 306 by deleting the rows and columns of those ports that are to be grounded. Numerically, the Y matrix reduction may be accomplished through execution of equation (3):

$$\overline{Y}_R = \overline{A}^T * \overline{Y} * \overline{A} \tag{3}$$

Taking multi-port simulation model 252 of FIG. 2A, for example, the $\overline{A}$ matrix is a 12×9 array having zero rows in the same position as the ground ports to be consolidated. Since solder ball ports $VSS\_1_B$, $VSS\_2_B$, and $VSS\_3_B$ are to be eliminated, then the $\overline{A}$ matrix of equation (4) may be $$\overline{A} = \begin{bmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{bmatrix} \tag{4}$$

used, whereby rows 10, 11, and 12 are zeroed as they represent the $VSS\_1_B$, $VSS\_2_B$, and $VSS\_3_B$ ports that are to be consolidated to ground. Next, the reduced Y matrix of equation (3) may be first converted to Z-parameters by operation of Y-parameter to Z-parameter converter 308 as in equation (5) and then $$\overline{Z}_R = \frac{1}{\overline{Y}_R} \tag{5}$$

converted into a reduced set of S-parameters as in equation (6):

$$\overline{S}_R = \left( \frac{\overline{Z}_R}{Z_0} - \overline{U} \right) \left( \frac{\overline{Z}_R}{Z_0} + \overline{U} \right)^{-1} \tag{6}$$

by operation of Z-parameter to S-parameter converter 310. The reduced set of S-parameters may then be delivered from ground port reducer 204 to common port reducer 206.

S-parameter to Z-parameter converter 312 then operates on the reduced set of S-parameters of equation (6), by converting them to Z-parameters as in equation (1) and then Z-parameter to Y-parameter converter 314 converts the Z-parameters to Y-parameters as in equation (2). The resulting admittance matrix may then be reduced as in equation (3) by Y-parameter reducer 316, but with matrix now being defined as in equation (7):

$$\overline{A} = \begin{bmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \\ 0 & 0 & 0 & 0 & 0 & 0 & 1 \end{bmatrix} \tag{7}$$

It can be seen that matrix A of equation (7) is a 9×7 matrix, where second occurrences of common ports are allocated as repeating rows to consolidate the common ports into one port through operation of Y-parameter reducer 316. For example, since the chip-side ports, $VDD\_1_C$ and $VDD\_2_C$, of multi-port simulation model 252 are recognized as common ports, they are allocated as identical rows 3 and 4, where the "1" in column 3 represents consolidated port 3, e.g., $VDD_C$, of reduced port simulation model 254. Furthermore, since the solder ball ports, $VDD\_1_B$ and $VDD\_2_B$, are also recognized as common ports, they are allocated as identical rows 8 and 9, where the "1" in column 7 represents consolidated port 7, e.g., $VDD_B$, of reduced port simulation model 254. The reduced admittance matrix may then be converted to Z-parameters by operation of Y-parameter to Z-parameter converter 318 as in equation (5) and then converted to S-parameters by operation of Z-parameter to S-parameter converter 320 as in equation (6) prior to being delivered to return port reducer 208.

At this point, the S-parameter file that is provided to return port reducer 208 has undergone two iterations of port reductions. First, ground port consolidation was implemented by ground port reducer 204 to eliminate, for example, 3 ports, i.e., $VSS\_1_B$, $VSS\_1_B$, and $VSS\_1_B$, from multi-port simulation model 252, which reduced the number of ports remaining to 9. Second, common port consolidation was implemented by common port reducer 206 to consolidate common ports, $VDD\_1_C/VDD\_2_C$ and $VDD\_1_B/VDD\_2_B$, into one port each, which resulted in an additional port reduction from 9 ports to 7 ports. It is recognized that the total possible number of port reductions that may be achieved is directly dependent upon the simulation model that is being optimized. Thus, the optimization of multi-port simulation model 252 to reduced port simulation model 254 is discussed merely as one example of port reduction that may be possible.

Additional port reduction may also be realized upon the recognition that simulation models may be defined such that both the chip-side ports and the solder ball ports either source, or sink, current. Furthermore, given that current sinks may be treated as current returns, they too may be eliminated as discussed in more detail below.

First, the S-parameter file, having undergone 2 iterations of consolidation, is received by S-parameter to Z-parameter converter 322 to obtain the respective Z-parameters as in equation (1). Next, the Z-parameters may then be used to relate voltage vector, $\overline{V}$, to current vector, $\overline{I}$, for each of the remaining ports as in equation (8):

$$\overline{V} = \overline{Z}\overline{I}, \tag{8}$$

which may then be re-written in vector form as in equation (9):

$$\begin{bmatrix} V_1 \\ V_2 \\ V_3 \\ V_4 \\ V_5 \\ V_6 \\ V_7 \end{bmatrix} \cdot = \overline{Z} \begin{bmatrix} I_1 \\ I_2 \\ I_3 \\ I_4 \\ I_5 \\ I_6 \\ I_7 \end{bmatrix} \tag{9}$$

Returning to reduced port simulation model 254 of FIG. 2B, an observation is made, such that chip-side ports $TXP_C$, $TXN_C$, and $VDD_C$ each represent current source ports, whereas port $VSS_C$ represents a current sink port. Writing a current equation around the chip-side ports, equation (10) is obtained:

$$I_1 + I_2 + I_3 + I_4 = 0, \tag{10}$$

where currents $I_1$ through $I_3$ are defined to be the current sourced by chip-side ports 1 through 3, i.e., $TXP_C$, $TXN_C$, and $VDD_C$, respectively, and $I_4$ is defined as the current returned to port 4, i.e., $VSS_C$. Solving for the return current, $I_4$, of equation (10), equation (11) is obtained as:

$$I_4 = -(I_1 + I_2 + I_3). \tag{11}$$

Thus, the current vector of equation (9) may be rewritten as in equation (12):

$$\overline{I} = \overline{P}\overline{I}_R, \tag{12}$$

where $\overline{P}$ is a reduction matrix that is effective to remove current $I_4$ from the current vector of equation (9) by defining current $I_4$ in terms of current $I_1$, $I_2$, and $I_3$ as in equation (11). Equation (12) may be written in matrix notation as in equation (13), where it is verified that the definition of $I_4$ is replaced with its equivalent expression of equation (11) through operation of the reduction matrix, $\overline{P}$.

$$\begin{bmatrix} I_1 \\ I_2 \\ I_3 \\ I_4 \\ I_5 \\ I_6 \\ I_7 \end{bmatrix} = \begin{bmatrix} 1 & 0 & 0 & 0 & 0 & 0 \\ 0 & 1 & 0 & 0 & 0 & 0 \\ 0 & 0 & 1 & 0 & 0 & 0 \\ -1 & -1 & -1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \begin{bmatrix} I_1 \\ I_2 \\ I_3 \\ I_5 \\ I_6 \\ I_7 \end{bmatrix} = \begin{bmatrix} I_1 \\ I_2 \\ I_3 \\ -(I_1+I_2+I_3) \\ I_5 \\ I_6 \\ I_7 \end{bmatrix} \tag{13}$$

Substituting equation (12) into equation (8), equation (14) may be written as:

$$\overline{V} = \overline{Z}(\overline{P}\overline{I}_R). \tag{14}$$

Multiplying both sides of equation (14) by the transpose of the reduction matrix, equation (15) is defined as:

$$\overline{P}^T \overline{V} = \overline{P}^T \overline{Z}(\overline{P}\overline{I}_R) = (\overline{P}^T \overline{Z} \overline{P})\overline{I}_R. \tag{15}$$

The leading term of equation (15) is taken to be an expression of the voltage vector for the reduced port system, which is given by equation (16) as:

$$\overline{V}_R = \overline{P}^T \overline{V} = \begin{bmatrix} 1 & 0 & 0 & -1 & 0 & 0 & 0 \\ 0 & 1 & 0 & -1 & 0 & 0 & 0 \\ 0 & 0 & 1 & -1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{bmatrix} \begin{bmatrix} V_1 \\ V_2 \\ V_3 \\ V_4 \\ V_5 \\ V_6 \\ V_7 \end{bmatrix} = \begin{bmatrix} V_1 - V_4 \\ V_2 - V_4 \\ V_3 - V_4 \\ V_5 \\ V_6 \\ V_7 \end{bmatrix} = \begin{bmatrix} V_{1R} \\ V_{2R} \\ V_{3R} \\ V_{4R} \\ V_{5R} \\ V_{6R} \end{bmatrix} \tag{16}$$

Thus, it can be seen, that the three remaining chip side voltages, e.g., $V_{1R} = V_1 - V_4$, $V_{2R} = V_2 - V_4$, and $V_{3R} = V_3 - V_4$, are each referenced to the $VSS_C$ voltage, e.g., $V_4$.

Next, Z-parameter reducer 324 may receive the Z-parameters as provided by S-Parameter to Z-parameter converter 322 and reduce them using the transpose of the reduction matrix as in equation (17):

$$\overline{Z}_R = \overline{P}^T \overline{Z} \overline{P}. \tag{17}$$

The reduced Z-parameters may then be provided to Z-parameter to S-parameter converter 326 for conversion back to S-parameters as in equation (6). Thus, through operation of return port reducer 208, a final reduction of multi-port simulation model 252 results in an S-parameter matrix having 6 port definitions. In addition, removal of port $VSS_C$ inherently produces the hard ground connection that is believed to result in the reduction in the amount of simulation time required by circuit simulator 130.

In an alternate embodiment, some of the processing steps of FIG. 3 may be avoided in order to increase efficiency. In particular, once the operation of Y-parameter reducer 306 is complete, converter processes 308-314 may be bypassed, such that Y-parameter reducer 316 receives the reduced Y-parameter matrix directly from Y-parameter reducer 306. Similarly, once the operation of Y-parameter reducer 316 is complete, converter processes 320-322 may be bypassed, such that Z-parameter reducer 324 receives the reduced Z-parameter matrix directly from Y-parameter to Z-parameter converter 318. Processing flow 328, therefore, provides the equivalent processing as discussed above, but increases efficiency by avoiding redundant parameter conversion processing steps.

Figure 4:
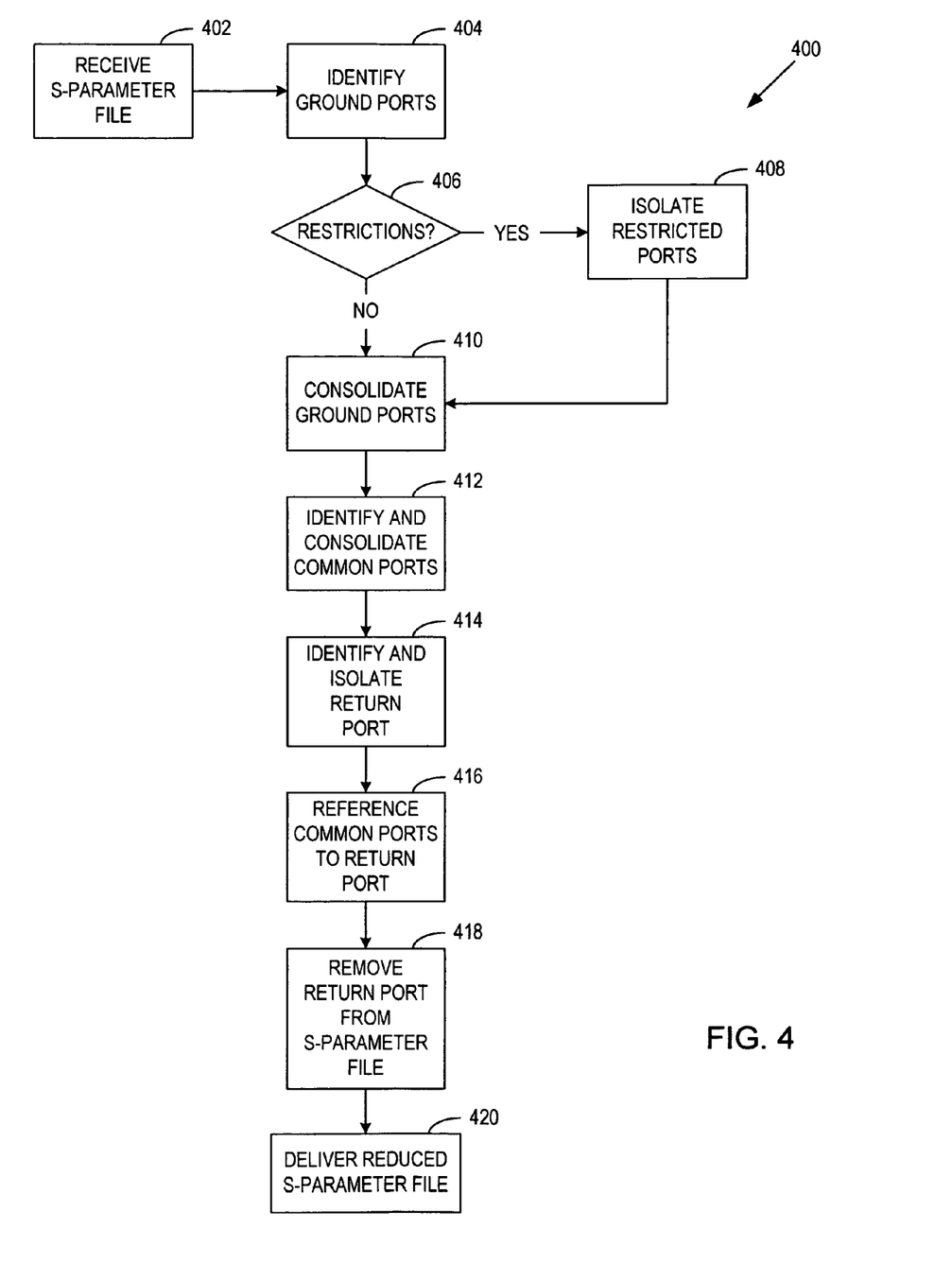
FIG. 4 illustrates an exemplary flow diagram of a method to reduce the number of ports of an S-parameter simulation file.

Turning to FIG. 4, a flow diagram of an exemplary method of S-parameter port reduction is illustrated. In step 402, an S-parameter file is received, for example, from S-parameter generator 124 of FIG. 1. In step 404, ground ports of the S-parameter file are identified and any restricted ground ports are also identified in step 406. If no restricted ground ports exist, then all identified ground ports are consolidated into a hard ground as in step 410.

A restricted ground port for the purposes of step 406 is, for example, a DC power supply, since even though it represents an AC ground, it may not be consolidated with other ground connections because power supplies are required to provide power and/or biasing to the simulated circuit. Another restricted ground port for the purposes of step 406 is, for example, a ground port that ties directly to the simulated circuitry, since forcing an ideal ground at a point where a zero voltage does not actually exist, may introduce anomalies into the simulated results. Thus, any restricted ground ports that are identified in step 406 are isolated in step 408 from the ground consolidation of step 410.

In step 412, all common ports are identified and consolidated. For example, chip-side ports $VDD\_1_C$ and $VDD\_2_C$ of multi-port simulation model 252 may be consolidated into chip-side port $VDD_C$ of reduced port simulation model 254. Likewise, solder ball ports $VDD\_1_B$ and $VDD\_2_B$ of multi-port simulation model 252 may be consolidated into solder ball port $VDD_B$ of reduced port simulation model 254.

Current analysis is performed in step 414, in order to determine which ports source current and which ports sink current. Those ports that sink current are then identified as the return port and labeled as a zero potential port. The previously identified ports that source current are then referenced to the zero potential port as in step 416. The zero potential port is then removed from the S-parameter file as in step 418. The S-parameter file, having undergone 3 iterations of port reductions, is then delivered, for example, to sub-circuit generator 128 so that circuit definition files may be generated. The circuit definition files may then be utilized by circuit simulator 130 for any circuit simulations that may be desired.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of reducing a number of ports within a circuit simulation file, the method comprising:
    consolidating ground ports within the circuit simulation file;
    consolidating a first set of common ports within the circuit simulation file;
    consolidating a second set of common ports within the circuit simulation file;
    identifying remaining ports as current providing ports and a return port within the circuit simulation file;
    referencing the second set of common ports to the return port; and
    removing the return port from the circuit simulation file.

2. The method of claim 1, wherein consolidating ground ports comprises identifying a number of non-restricted ground ports within the circuit simulation file.

3. The method of claim 2, wherein consolidating ground ports further comprises:
    identifying a number of restricted ground ports within the circuit simulation file; and
    preventing the consolidation of the number of restricted ground ports identified within the circuit simulation file.

4. The method of claim 3, wherein consolidating ground ports further comprises:
    converting the circuit simulation file from a first parameter type to a second parameter type;
    converting the circuit simulation file from the second parameter type to a third parameter type; and
    reducing the number of non-restricted ground ports in the circuit simulation file to generate a ground port reduced file.

5. The method of claim 4, wherein consolidating ground ports further comprises:
    converting the ground port reduced file from the third parameter type to the second parameter type; and
    converting the ground port reduced file from the second parameter type to the first parameter type.

6. The method of claim 5, wherein consolidating the first set of common ports comprises identifying a number of common ports that exist within the ground port reduced file.

7. The method of claim 6, wherein consolidating the first set of common ports further comprises:
    converting the ground port reduced file from the first parameter type to the second parameter type;
    converting the ground port reduced file from the second parameter type to the third parameter type; and
    combining the number of common ports that exist in the first set into one or more ports to generate a common port reduced file.

8. The method of claim 7, wherein consolidating the first set of common ports further comprises:
    converting the common port reduced file from the third parameter type to the second parameter type; and
    converting the common port reduced file from the second parameter type to the first parameter type.

9. The method of claim 8, wherein referencing the second set of common ports comprises expressing a voltage associated with the second set of common ports in terms of a voltage associated with the return port.

10. A computer-readable medium having instructions stored thereon which are executable by a circuit simulation device for reducing a number of ports within a circuit simulation file by performing steps comprising:
    consolidating ground ports within the circuit simulation file;
    consolidating a first set of common ports within the circuit simulation file;
    consolidating a second set of common ports within the circuit simulation file;
    identifying remaining ports as current providing ports and a return port within the circuit simulation file;
    referencing the second set of common ports to the return port; and
    removing the return port from the circuit simulation file.

11. The computer readable medium of claim 10, wherein the step of consolidating ground ports comprises identifying a number of non-restricted ground ports within the circuit simulation file.

12. The computer readable medium of claim 11, wherein the step of consolidating ground ports further comprises:
    identifying a number of restricted ground ports within the circuit simulation file; and
    preventing the consolidation of the number of restricted ground ports identified within the circuit simulation file.

13. The computer readable medium of claim 12, wherein the step of consolidating ground ports further comprises:
    converting the circuit simulation file from a first parameter type to a second parameter type;
    converting the circuit simulation file from the second parameter type to a third parameter type; and
    reducing the number of non-restricted ground ports in the circuit simulation file to generate a ground port reduced file.

14. The computer readable medium of claim 13, wherein the step of consolidating ground ports further comprises:
    converting the ground port reduced file from the third parameter type to the second parameter type; and
    converting the ground port reduced file from the second parameter type to the first parameter type.

15. The computer readable medium of claim 14, wherein the step of consolidating the first set of common ports comprises identifying a number of common ports that exist within the ground port reduced file.

16. The computer readable medium of claim 15, wherein the step of consolidating the first set of common ports further comprises:
- converting the ground port reduced file from the first parameter type to the second parameter type;
- converting the ground port reduced file from the second parameter type to the third parameter type; and
- combining the number of common ports that exist in the first set into one or more ports to generate a common port reduced file.

17. The computer readable medium of claim 16, wherein the step of consolidating the first set of common ports further comprises:
- converting the common port reduced file from the third parameter type to the second parameter type; and
- converting the common port reduced file from the second parameter type to the first parameter type.

18. The computer readable medium of claim 17, wherein the step of referencing the second set of common ports comprises expressing a voltage associated with the second set of common ports in terms of a voltage associated with the return port.

19. A circuit simulation system, comprising:
- a processor adapted to generate a reduced port S-parameter file from a multiple port S-parameter file, the processor being adapted to perform computations including,
  - generating the multiple port S-parameter file;
  - consolidating ground ports within the multiple port S-parameter file to generate a first reduction file, the first reduction file having fewer port definitions as compared to the multiple port S-parameter file;
  - consolidating a first set of common ports within the first reduction file to generate a second reduction file, the second reduction file having fewer port definitions as compared to the first reduction file;
  - consolidating a second set of common ports within the circuit simulation file;
  - identifying remaining ports as current providing ports and a return port;
  - referencing the second set of common ports in the second reduction file to the return port; and
  - removing the return port from the second reduction file to generate the reduced port S-parameter file, the reduced port S-parameter file having fewer port definitions as compared to the second reduction file.

20. The circuit simulation system of clam 19, wherein referencing a second set of common ports comprises:
- identifying a first set of ports within the second reduction file that provide current having a first signed magnitude;
- identifying a second set of ports within the second reduction file that provide current having a second signed magnitude; and expressing a voltage associated with the first set of ports in terms of a voltage associated with the second set of ports.

* * * * *